(12) United States Patent
Volfson

(10) Patent No.: US 9,038,305 B2
(45) Date of Patent: May 26, 2015

(54) QUICK-DETACH ACCESSORY BASE MOUNT FOR AN ACCESSORY RAIL

(71) Applicant: Leo Volfson, San Diego, CA (US)

(72) Inventor: Leo Volfson, San Diego, CA (US)

(73) Assignee: Torrey Pines Logic, Inc., San Diego, CA (US)

( * ) Notice: Subject to any disclaimer, the term of this patent is extended or adjusted under 35 U.S.C. 154(b) by 63 days.

(21) Appl. No.: 13/923,044

(22) Filed: Jun. 20, 2013

(65) Prior Publication Data

US 2014/0373329 A1 Dec. 25, 2014

(51) Int. Cl.
*F16M 13/02* (2006.01)

(52) U.S. Cl.
CPC ........... *F16M 13/02* (2013.01); *Y10T 29/49826* (2013.01)

(58) Field of Classification Search
CPC ..... F41G 11/003; F41G 1/387; F41G 11/004; F41G 11/002
USPC ............. 42/127, 90, 111, 112, 124, 125, 128, 42/148, 119
See application file for complete search history.

(56) References Cited

U.S. PATENT DOCUMENTS

| | | | | |
|---|---|---|---|---|
| 1,856,549 | A * | 5/1932 | Griffin et al. | 42/127 |
| 3,877,166 | A * | 4/1975 | Ward | 42/127 |
| 5,680,725 | A * | 10/1997 | Bell | 42/127 |
| 6,931,778 | B1 | 8/2005 | Nelson et al. | |
| 8,397,421 | B2 * | 3/2013 | Ding et al. | 42/124 |
| 8,567,105 | B1 * | 10/2013 | Bobro | 42/90 |
| 8,806,796 | B1 * | 8/2014 | Clifton | 42/90 |
| 2011/0067287 | A1 * | 3/2011 | Collin et al. | 42/119 |
| 2012/0167438 | A1 * | 7/2012 | Daniel et al. | 42/90 |

* cited by examiner

*Primary Examiner* — Samir Abdosh
*Assistant Examiner* — John D Cooper
(74) *Attorney, Agent, or Firm* — Fish & Richardson P.C.

(57) ABSTRACT

In some aspects a quick-detach (QD) accessory base mount includes a body. The body includes an accessory engagement interface configured to engage an accessory and a rail engagement interface defining a channel adapted to receive an accessory rail. A rail clamp is carried by the body and is moveable to selectively clamp the body to the accessory rail. A mounting arm extends outwardly from the body and is carried to rotate relative to the body between a first position and a second position. A cam is configured to support the rail clamp to grip the accessory rail and to clamp the body to the accessory rail when the mounting arm is in the first position and to release the rail clamp from gripping the accessory rail when the mounting arm is in the second position.

17 Claims, 6 Drawing Sheets

QUICK-DETACH ACCESSORY BASE MOUNT FOR AN ACCESSORY RAIL

BACKGROUND

The specification relates to a quick-detach accessory base mount for rapid attachment/detachment of an accessory device to an accessory rail ("rail"). A rail is commonly used on a mounting apparatuses such as firearms to provide a mounting platform for various accessory devices. Other mounting apparatuses, such as tripods, camera stands, and other things have these rails. Accessories often include cameras, optical scopes, telescopes, lights, laser aiming/indicator modules, backup weapon sights, foregrips, bipods, and night-vision equipment. Attachment/detachment of an accessory attached with rigid-attachment-type methods, such as ring, bracket, and/or screw fasteners, can be time consuming and complicated due to a need for tools and/or repetitive actions to perform the attachment/detachment of the accessory from a mounting apparatus. Use of other attachment methods, such as a rotating surface that directly engages and secures an accessory to a rail surface can, over time, chafe a rail's finish and damage the rail.

SUMMARY

In a general aspect, an accessory base mount includes a cam-supported rail clamp moveable to selectively clamp the accessory base mount to an accessory rail ("rail").

In some aspects, a quick-detach (QD) accessory base mount ("QD mount") includes a body. The body includes an accessory engagement interface configured to engage an accessory and a rail engagement interface defining a channel adapted to receive a rail. A rail clamp is carried by the body and is moveable to selectively clamp the body to the rail. A mounting arm extends outwardly from the body and is carried to rotate relative to the body between a first position and a second position. A cam is configured to support the rail clamp to grip the rail and to clamp the body to the rail when the mounting arm is in the first position and to release the rail clamp from gripping the rail when the mounting arm is in the second position.

Implementations may include one or more of the following features. The cam comprises a first portion defined by the mounting arm and a second portion defined by the rail clamp. The channel is defined by the body as a first wall and a second wall, the first wall comprising a first engagement surface adapted to grip a first side of the rail and the second wall comprising a resting surface adapted to support a portion of a second side of the rail. The rail clamp comprises a second engagement surface adapted to grip the second side of the rail. The channel is narrower at an end. The rail clamp is springily biased in an ungripped position.

Additionally or alternatively, these and other implementations may include one or more of the following features. An interlock configured to selectively restrict rotation of the mounting arm between the first position and the second position. The interlock comprising a depressible interlock button springily biased to extend outward from the body to a position blocking rotation of the mounting arm between the first position and the second position and depressible to a position allowing rotation of the mounting arm between the first position and the second position.

Additionally or alternatively, these and other implementations may include one or more of the following features. An interlock set screw coupled to the depressible interlock button, the interlock set screw rotatable to adjust the outward extension of the depressible interlock button from the body. A preload screw coupled with a pivot shaft, the pivot shaft coupled with the mounting arm and the preload screw rotatable to adjust the outward extension of the mounting arm from the body and a springily-biased position of the rail clamp.

Additionally or alternatively, these and other implementations may include the following feature. A slot engagement bar for engaging with a slot configured into the rail to prevent lateral movement of the body along an axis transverse to the slot.

Additionally or alternatively, these and other implementations may include the following feature. The second portion of the cam comprises a surface configured to prohibit rotation of the mounting arm beyond at least one rotational endpoint defined by the first position and the second position.

Additionally or alternatively, these and other implementations may include one or more of the following features. A cam supports a rail clamp to grip a rail when a mounting arm is in a first position and to release the rail clamp when the mounting arm is in a second position.

Additionally or alternatively, these and other implementations may include one or more of the following features. An interlock selectively restricts rotation of the mounting arm between the first position and the second position. A rail engagement interface receives the rail into a channel narrower at one end. A cam configuration prohibits rotation of the mounting arm beyond rotational endpoints defined by the first position and the second position.

Additionally or alternatively, these and other implementations may include one or more of the following features. A rail is gripped with a rail clamp supported by a cam in response to rotation of a mounting arm to a first position. The rail clamp is released in response to rotation of the mounting arm to a second position.

Additionally or alternatively, these and other implementations may include one or more of the following features. Rotation of the mounting arm between the first and the second position is blocked using an interlock. The rail is received into a rail engagement interface channel narrower at one end. The cam is configured to prohibit rotation of the mounting arm beyond rotational endpoints defined by the first position and the second position.

Implementations of these and other aspects may include one or more of the following advantages. The QD mount can allow rapid attachment/detachment of accessories to a rail. Attachment can be extremely precise and preserve, for example, an optical scope zero, a laser aiming point, and backup weapon sight alignment. Operation of the QD mount can be performed with two fingers, for example a thumb and forefinger, and the operating hand used to grasp and remove the QD mount and attached accessory from the rail. The QD mount allows a preload to be adjusted to compensate for mechanical tolerance variations between different type rails. The QD mount clamps to a rail with a squeezing action without causing chafing of the rail finish caused by other QD mounts that apply a securing force to the rail using a surface that rubs against the rail. Other advantages will be apparent to those skilled in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Figure 1:
FIG. 1 is an illustration of a quick-detach (QD) accessory base mount ("QD mount") attached to an accessory rail on a firearm.

FIG. 1 is an illustration of a mounted quick-detach (QD) accessory base mount 100 ("QD mount"). The QD mount 102 with an attached accessory 104 is mounted to an accessory rail ("rail") 106 which is attached to a firearm 108. In other implementations, the QD mount 102 can be attached to a mounting apparatus other than a firearm 108 with a rail 106. Other mounting apparatuses can include a tripod, a fence, a building, or a vehicle. The QD mount 102 acts as a mounting interface between an accessory 104 and the rail 106.

The accessory 104 can be any type of device mounted on a particular mounting apparatus. For example, accessory 104 can include cameras, optical scopes, telescopes, lights, laser aiming/indicator modules, backup weapon sights, foregrips, bipods, and night-vision equipment.

A QD mount 102 can typically be attached/detached in a relatively quick manner from a rail. Attachment/detachment is often performed through the use of levers or thumbscrews.

For the purposes of this disclosure, a rail 106 is a structure, such as a bracket, for mounting an accessory to a mounting apparatus. In some implementations, the rail 106 has a T-shaped cross-section with a smaller lower profile adjacent to a particular mounting apparatus (e.g., firearm 108) and a larger upper profile apart from the mounting apparatus and adjacent to an accessory 104. In certain implementations, the T-shaped cross-section has a sloping/angled or curved surface that spans between the smaller lower profile and the larger upper profile of the rail 106. Examples of a T-shaped rail 106 can include a WEAVER or PICATINNY (also known as a MIL-STD-1913, STANAG 2324, or "tactical" rail). In other implementations, the cross-section of rail 106 can be round, oval, square, rectangular, flat or other shape. In some implementations, the rail 106 can be flexible, such as a rope/cable, flexible rod, or wire. In some implementations, a rail 106 can include one or more spacing slots perpendicular to the length of the rail. The one or more spacing slots can be used to engage a bar, pin, screw, protrusion, or the like associated with the QD mount 102 to prevent lateral movement of the QD mount 102 along an axis transverse to the slot. In other implementations, friction can prevent movement of the QD mount 102 along the rail 106. Generally accessories are mounted to the rail 106 either by sliding on from one end of the rail 106 or by attachment from the sides of the rail 106 and securing the QD mount 102 using levers or thumbscrews to secure the QD mount to the rail 106.

In some implementations, QD mount 102 can be repetitively secured to the rail 106 by a clamping mechanism that squeezes the rail to provide rapid attachment/detachment and precise/sturdy clamping of the QD mount 102 to the rail 106 without chafing of the rail's 106 finish and/or other damage (such as gouging, scratching, etc.). The following description relates to an implementation of a QD mount 102 with such a clamping mechanism.

Figure 2:
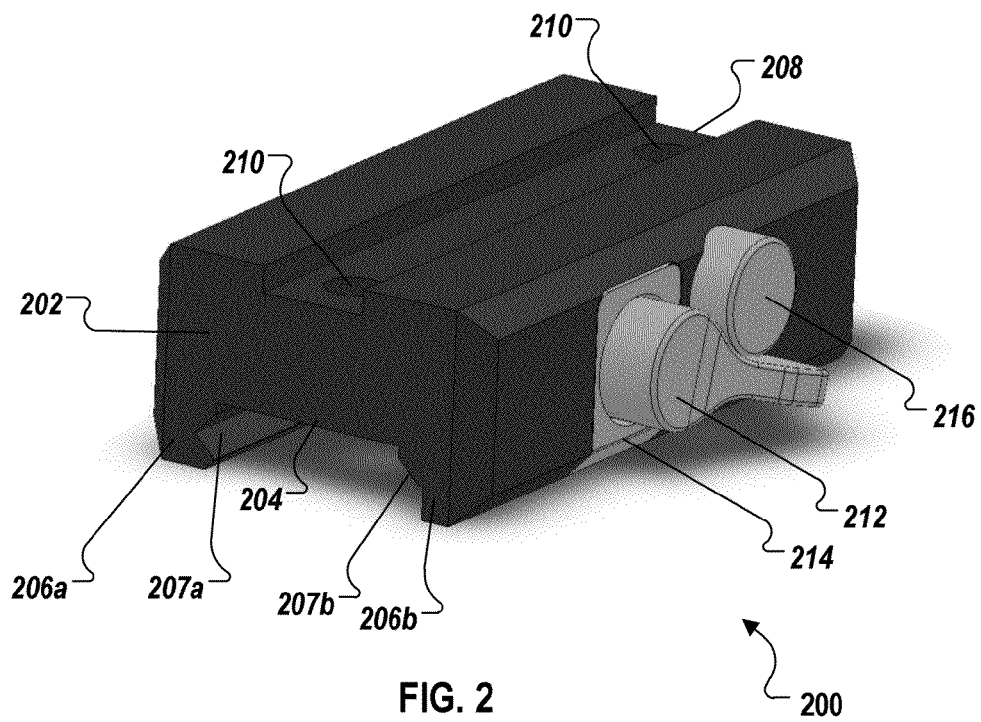
FIG. 2 is a perspective view of an example QD mount with a clamping mechanism according to an implementation.

FIG. 2 is a perspective view of an example QD mount 200 with a clamping mechanism according to an implementation. The QD mount 200 includes a body 202 defining a rail engagement interface 204 and an accessory engagement interface 208.

The rail engagement interface 204 defines a channel in the body 202 to receive a rail 106. The channel is defined by the body 202 as a first wall 206a and a second wall 206b and is oriented parallel to the length of the rail 106. The first wall 206a defines a first engagement surface 207a adapted to grip a first side of a rail 106.

In the illustrated implementation, the first engagement surface 207a is configured as a V-shaped, angled surface where the angle of the first engagement surface 207a matches the angles formed by the chamfers of the larger upper portion of a first side of rail 106 to grip the first side of the rail 106. In other implementations, the first engagement surface 207a can be configured to grip other rail shapes, for example a rail with curves, such as a round rod, or a rail with square sides.

The second wall 206b defines a resting surface 207b adapted to rest against a portion of a second side of a rail 106. The resting surface 207b angle matches an angle of chamfer formed by the surface of the second side of the rail 106 that rests against the resting surface 207b. In some implementations, the angle formed by the surface of first engagement surface 207a adjacent to the surface 205 (refer to FIGS. 3 and 6A/6B for detail as to surface 205) between the first wall 206a and the second wall 206b is similar to the angle formed by the resting surface 207b relative to surface 205. The similarity of angles serves to equalize the loading force on the surface of the first engagement surface 207a adjacent to the surface 205 and the resting surface 207b. Configurations of the rail engagement interface supporting a rail 106 with dissimilar chamfer angles on the first and/or second side of the rail 106 is also envisioned. A straight wall parallel to the first wall 206a is adjacent to the resting surface 207b and does not contact the second side of the rail 106. In other implementations, resting surface 207b and/or the second engagement surface (see FIGS. 3 and 6A/B) is configured similar to the first engagement surface to grip other rail shapes (described above).

The accessory engagement interface 208 is configured to engage an accessory, for example accessory 104 as illustrated in FIG. 1. As illustrated in FIG. 2, the accessory engagement interface 208 is configured as a groove forming parallel opposing walls. The accessory engagement interface 208 groove is oriented parallel to the rail engagement interface 204. The accessory engagement interface is illustrated with two screw holes 210. The accessory engagement interface 208 receives an accessory interface and screws are threaded through the screw holes 210 and into the accessory interface. The screws are tightened to secure the accessory interface to the body 202. In other implementations, the accessory engagement interface 208 can be configured in any manner to support various configurations of accessory interfaces.

As shown, the body 202 also carries a mounting arm 212 and rail clamp 214. The mounting arm 212 extends outwardly from the body 202 and is carried to rotate relative to the body 202 between a first position and a second position. The mounting arm 212 is configured to include a paddle-shaped structure to manipulate/rotate with a finger or other object. In other implementations, the mounting arm 212 can be configured to form other shapes, for example a bar/lever or a thumb-screw-type twist attachment.

Rotation of the mounting arm 212 between the first position and the second position causes the rail clamp 214 to move inwardly toward the resting surface 207b (gripped position) and outwardly away from the resting surface 207b (ungripped position), respectively. The rail clamp 214 forms a second engagement surface (see FIGS. 3 and 6A/B) to grip the second side of the rail 106.

A cam (see FIGS. 3 and 4A/B for additional detail) is configured to support the rail clamp 214 to selectively grip the second side of the rail 106 and to clamp the body 202 to the rail 106 when the mounting arm 212 is in the first position and to release the rail clamp 214 from gripping the second side of the rail 106 when the mounting arm 212 is in the second position.

The body also carries an interlock configured to selectively restrict rotation of the mounting arm 212 between the first and the second position. As shown, the interlock is configured as a cylindrical, depressible interlock button ("button") 216, springily biased to extend outward from the body 202 into a position blocking rotation of the mounting arm 212 unless depressed to allow the mounting arm 212 to rotate past the button 216. In other implementations, the interlock can have various other configurations. For example, the interlock could be a ball bearing springily biased outwardly from the body to restrict rotation of the mounting arm 212 unless sufficient rotational force on the mounting arm 212 is applied to overcome the spring bias of the ball bearing or the ball bearing is depressed. Other interlock configurations could include, for example, a springily biased pin, lever, or other structure to restrict rotational motion of the mounting arm 212. In some implementations, the illustrated button 216 could have a portion of the "top" edge of the front surface milled away at an angle to allow the mounting arm 212 to be rotated to the first position without a separate positive action to depress the button 216. In this implementation, the mounting arm 212 would depress the button 216 as it contacts the angled surface configured into the button 216 and the button would lock into an outward biased position once the mounting arm 212 cleared the button 216. Rotation of the mounting arm 212 back to the second position would require a positive action to depress the button 216 in order to allow the mounting arm 212 to clear the button 216 and to rotate into the second position. Operation of the mounting arm 212 and the button 216 is designed to be typically performed with one hand allowing for rapid attachment/detachment of the QD mount 200 from a rail 106.

Figure 3:
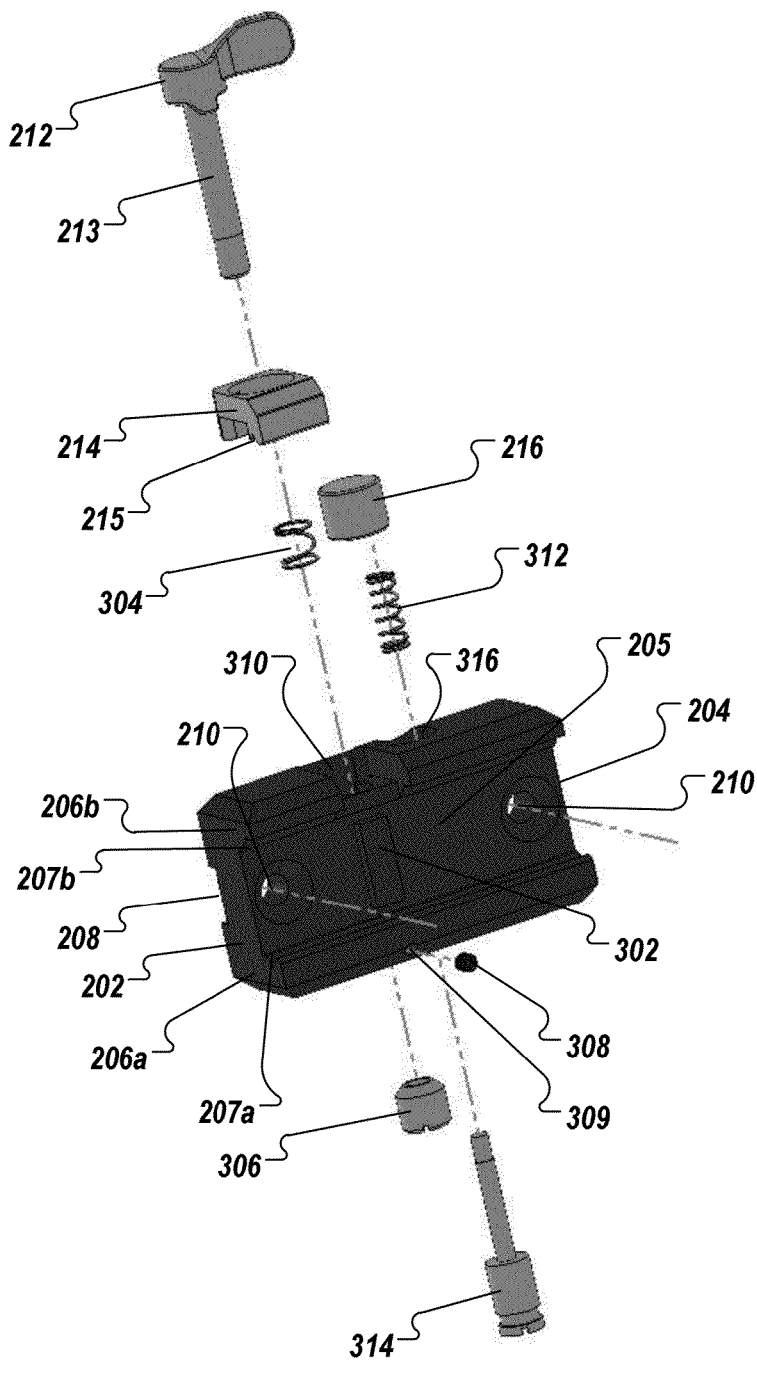
FIG. 3 is an exploded perspective view of the example QD mount 200 of FIG. 2.

FIG. 3 is an exploded perspective view 300 of the example QD mount 200 of FIG. 2. The illustrated exploded QD mount 200 includes a slot engagement bar 302, a mounting arm assembly, and an interlock assembly.

The slot engagement bar 302 is integrally formed from the body 202 into a rectangular shape of a size to engage with a slot formed into a rail 106. When engaged with the rail 106 slot, the slot engagement bar 302 prevents lateral movement of the QD mount 200 on the rail 106 along an axis transverse to the slot. In other implementations, the slot engagement bar can be a separately formed component that is attached to the QD mount 200, for example by pinning, welding, adhesive, or the like. In other implementations, the slot engagement bar can be omitted from QD mount 200.

The mounting arm assembly includes a mounting arm 212, a pivot shaft 213, a rail clamp 214, a rail clamp bias spring 304, a preload screw 306, and a preload grub screw 308. The mounting arm 212 is coupled with a pivot shaft 213. In some implementations, the mounting arm 212 can be integrally formed as part of the mounting arm 212. In other implementations, the mounting arm 212 can be attached to the pivot shaft 213 by means of a pin, threading, a weld, adhesive, or in some other manner. The illustrated pivot shaft 213 is shown threaded at the end opposite to the mounting arm 212. The preload screw 306 threads onto the pivot shaft 213 at the threaded end of the pivot shaft 213 opposite the mounting arm 212. The rail clamp 214 receives the pivot shaft 213. The pivot shaft 213 passes through the rail clamp bias spring 304. The mounting arm assembly slot 310 in body 202 receives the pivot shaft into a hole formed through the body (indicated by a dashed witness line), and the preload screw 306 attached to the pivot shaft in pivot shaft hole 311 (indicated by a dashed witness line).

The rail clamp bias spring 304 engages the mounting arm assembly slot 310 on one side and the underside of the rail clamp 214 on the other side and provides an outward spring bias toward the mounting arm 212 (ungripped position). The mounting arm assembly slot 310 limits the rail clamp bias spring 403 from traveling along the pivot shaft 213 into the body 202. For example, a hole for the pivot shaft 213 formed in the mounting arm assembly slot 310 can be configured to conform to the pivot shaft 213 to permit pivot shaft 213 rotation but to prevent the rail clamp bias spring 304 from travelling along the pivot shaft 213 beyond the formed hole for the pivot shaft 213. In some implementations, the rail clamp 214 can have an indentation, cutout, or other structure to more securely hold the rail clamp bias spring 304.

The preload grub screw hole 309 (indicated by a dashed witness line) receives the preload grub screw 308. Preload grub screw hole 309 is configured to allow the preload grub screw 308 to physically rotate between an engaged position, for example screwed further into the body 202, contacting the preload screw 306 and an unengaged position, for example screwed outward toward the surface of the body 202. When the preload grub screw 308 is in the engaged position, friction and/or mechanical contact between the preload grub screw 308 and the preload screw 306 prevents the preload screw 306 from rotating. When the preload grub screw 308 is in the unengaged position, the preload screw 306 can be rotated.

Rail clamp 214 forms a second engagement surface 215 to engage the second side of a rail 106. In some implementations, the second engagement surface is similar in configuration to a shorter portion of the above-described first engagement surface 207a and grips the second side of a rail 106 in a manner similar to the first engagement surface 207a.

Rotation of the preload screw 306 permits adjustment of the outward extension of the mounting arm 212 and the rail clamp 214 either in an outward or inward direction relative to the body 202. This adjustment provides a clamping preload to be adjusted between the mounting arm 212, rail clamp 214, and a particular rail 106. The clamping preload adjustment allows for compensation related to mechanical tolerance variations between different rails 106 and/or for a setting a desired clamping/squeezing force between the QD mount 200 and the particular rail 106. For example, adjusting the outward extension of the mounting arm 212 and rail clamp 214 to a more outward position would decrease the clamping preload and a clamping/squeezing force on the particular rail 106. Adjusting the outward extension of the mounting arm 212 and rail clamp 214 to a more inward position would increase the clamping preload and the clamping/squeezing force on the particular rail 106.

Figure 4A:
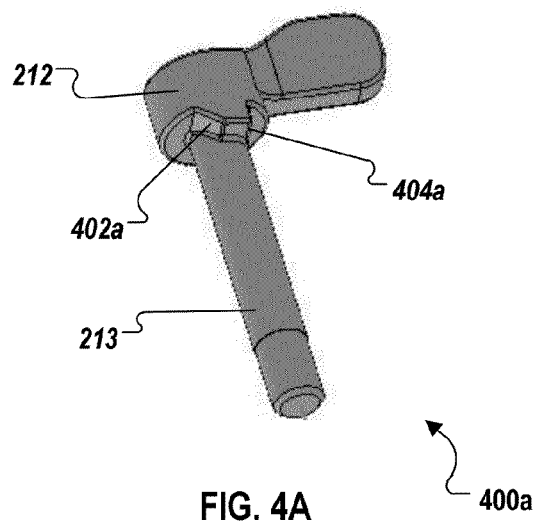
FIG. 4A is a detail perspective view of a mounting arm cam surface of the example QD mount 200.
Figure 4B:
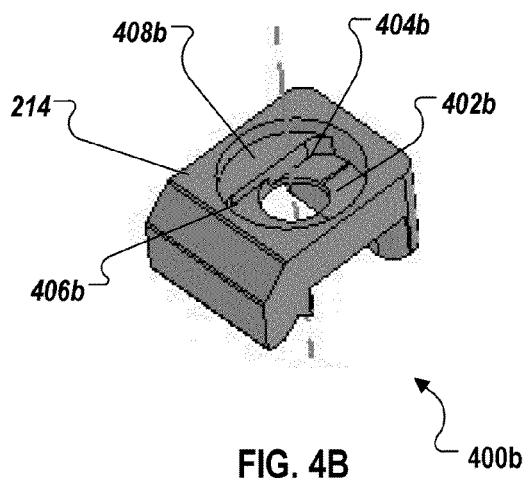
FIG. 4B is a detail perspective view of a rail clamp cam surface and rotation prohibiting surface of the example QD mount 200.

The mounting arm 212 and rail clamp 214 form a first and second portion of a cam, respectively, configured to support the rail clamp 214 to grip the rail 106 and clamp the body 202 to the rail 106 when the mounting arm 212 is in a first position (gripped position) and to release the rail clamp 214 from gripping the rail 106 when the mounting arm 212 is in the second position (ungripped position). Referring to FIGS. 4A-4B, FIG. 4A is a detailed perspective view 400a of a mounting arm 212 cam surface 402a of the example QD mount 200. As shown, the cam surface 402a forms a ramped surface and a flat surface. The flat surface is parallel to the plane forming the base of the ramped surface. FIG. 4B is a detailed perspective view 400b of a rail clamp cam surface 402b and rotation prohibiting surface 408b of the example QD mount 200. As shown, the rail clamp cam surface 402b forms a ramped surface along the perimeter of a hole formed in the rail clamp 214. The hole receives the pivot shaft 213 and the pivot shaft 213 turns within the hole. The flat surface of cam surface 402a engages with the rail clamp cam surface 402b. In other implementations, the ramped surface of cam surface 402a can engage the rail clamp cam surface 402b. In still other implementations, both the ramped surface and the flat surface of cam surface 402a can engage the rail clamp cam surface 402b. As the mounting arm 212 is rotated toward the first position (indicated by 406b), the flat surface of cam surface 402a slides along rail clamp cam surface 402b from 404b to 406b (lower ramp surface to higher ramp surface of the rail clamp cam surface 402b), forces the rail clamp 214 to travel along the axis of the pivot shaft 213 inwardly relative to the rail clamp bias spring 304 bias. The inward movement of the rail clamp 214 compresses the rail clamp bias spring 304 and squeezes the rail clamp 214 second engagement surface 215 against the second side of a rail 106 to grip the second side of the rail 106. Rotating the mounting arm 212 toward the second position (indicated by 404b) allows the rail clamp to travel outwardly along the pivot shaft 213 axis relative to the bias of the rail clamp bias spring 304. The outward movement of the rail clamp 214 allows the rail clamp bias spring 304 to decompress. The outward movement of the rail clamp 214 releases the rail clamp 214 second engagement surface 215 grip on the second side of the rail 106 permitting the QD mount 200 to be unclamped from the rail 106.

The rotation prohibiting surface 408b of FIG. 4B is adapted to prohibit the mounting arm 212 from rotating beyond an endpoint defined by at least the second position (indicated by 404b). If the mounting arm 212 is rotated so that the cam surface 402a slides back toward 404b, surface 404a will engage the shelf formed by rotation prohibiting surface 408b and prohibit the mounting arm 212 from continuing to rotate past the position defined by 404b. In some implementations, surface 404b is perpendicular to the flat surface of cam surface 402a. In some implementations, a surface (or equivalent structure) (not illustrated) can be formed into the ramped surface of cam surface 402a to engage rotation prohibiting surface 408b at position 406b to prevent the mounting arm 212 from rotating past the first position. In some implementations, the rotation prohibiting surface 408b can be omitted.

Returning to FIG. 3, the interlock assembly includes a button 216, an interlock bias spring 312, and an interlock set screw 314. The interlock set screw 314 is shown as threaded on one end. The interlock set screw hole (indicated with dashed witness line) receives the interlock set screw 314. The interlock set screw hole is formed through the body 202. The button 216 is configured with a threaded hole adapted to be screwed onto the interlock set screw 314 threads. The interlock assembly hole 316 receives the button 216. The interlock bias spring 312 provides an outward spring bias to the button 216. In some implementations, the interlock bias spring 312 is captured by the interlock set screw 314 between the button and the floor of the interlock assembly hole 316. In other implementations, an indentation, cutout, or other structure is formed in the button 216 and/or the interlock assembly hole 316 to separately capture the interlock bias spring 312. In the implementation where the spring is captured apart from the interlock set screw 314, the separately captured interlock bias spring 312 can serve to prevent rotation of the button 216. This can be useful in instances where a surface of the button 216 is configured, as described above in relation to FIG. 2, to allow the mounting arm 212 to automatically compress the button 216 when rotated into the first position. In the implementation where the interlock bias spring 312 is captured by the interlock set screw 314, the interlock assembly hole 316 can limit the interlock bias spring 312 from traveling along the interlock set screw 314 into the body 202. For example, a hole for the interlock set screw 314 formed in the interlock assembly hole 316 can be configured to conform to the interlock set screw 314. The interlock assembly hole 316 can receive the interlock bias spring 312 captured by the interlock set screw 314 shaft and prevent the interlock bias spring 312 from travelling along the interlock set screw 314 shaft beyond the formed hole for the interlock set screw 314. In the implantation, where the interlock bias spring 312 is captured by the interlock set screw 314, a groove/channel can be formed into the button 216 to engage with a protrusion (not illustrated) associated with the interlock assembly hole 316 to prevent rotation of the button 216. The protrusion can be either integrally formed as part of the interlock assembly hole 316 or created, for example the body 202 can receive a pin, screw, or other structure into the interlock assembly hole. For example, a hole formed in the second wall perpendicular to the interlock set screw 314 shaft axis can receive a roll pin that engages a channel formed into the button 216.

Rotating the interlock set screw adjusts the outward extension of the button 216 from the body 202. A greater outward extension increases the distance/effort needed to depress the button 216 and to rotate the mounting arm 212, whereas a lesser outward extension decreases the distance/effort needed to depress the button 216 to allow the mounting arm 212 to rotate. In some implementations, an interlock grub screw (not illustrated) similar to the preload grub screw 308 described above can be configured similarly to allow/prohibit the rotation of the interlock set screw 314.

In some implementations, the rail engagement interface is narrower at one end. For example, the endpoints formed by the first engagement surface 207a of the first wall 206a can be formed to be slightly closer to the second wall than the midpoint of the first engagement surface 207a formed by the first wall 206a. This configuration provides a stable "tri-point"-type engagement configuration with a rail 106.

In FIG. 3, screw holes 210 are shown as countersunk to the surface of rail engagement interface 204. The countersunk surface permits screw heads to remain at least flush with the surface 205 of rail engagement interface 204 so as to not interfere with an engagement of a rail 106 with the QD mount 200. In some implementations, screw holes 210 can be omitted. In some implementations, an accessory interface can receive screws to be screwed into holes threaded into the accessory engagement interface 208. Other methods of attaching an accessory to the QD mount 200 will be apparent to those of skill in the art.

Figure 5A:
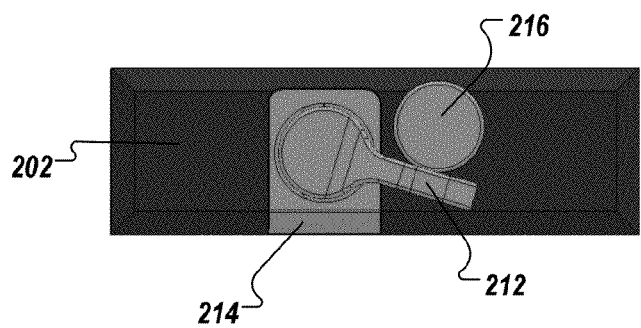
FIG. 5A is a side view of the QD mount 200 with the mounting arm in a first (gripping) position.

FIG. 5A is a side view 500a of the QD mount 200 with the mounting arm 212 in a first (gripping) position. As shown, mounting arm 212 is underneath and resting against the button 216. In some implementations, it is not necessary for the mounting arm 212 to rest against the button 216. The button 216 prevents the mounting arm 212 from being rotated counterclockwise past the button 216 without the button 216 being depressed far enough to allow the mounting arm 212 to clear the button 216.

Figure 5B:
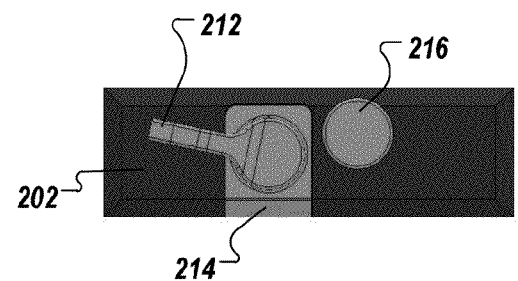
FIG. 5B is a side view of the QD mount 200 with the mounting arm in a second (released) position.

FIG. 5B is a side view 500b of the QD mount 200 with the mounting arm 212 in a second (released) position. The button 216 prevents the mounting arm 212 from being rotated clockwise past the button 216 without the button 216 being depressed far enough to allow the mounting arm 212 to clear the button 216. As described above in relation to FIG. 2, in some implementations, the illustrated button 216 could have a portion of the "top" edge of the front surface milled away at an angle to allow the mounting arm 212 to be rotated to the first position without a separate positive action to depress the button 216. In this implementation, the mounting arm 212 would depress the button 216 as it contacts the angled surface configured into the button 216 and the button would lock into an outward biased position once the mounting arm 212 cleared the button 216. Rotation of the mounting arm 212 back to the second position would require a positive action to depress the button 216 in order to allow the mounting arm 212 to clear the button 216 and to rotate into the second position. Operation of the mounting arm 212 and the button 216 is designed to be typically performed with one hand allowing for rapid attachment/detachment of the QD mount 200 from a rail 106.

Figure 6A:
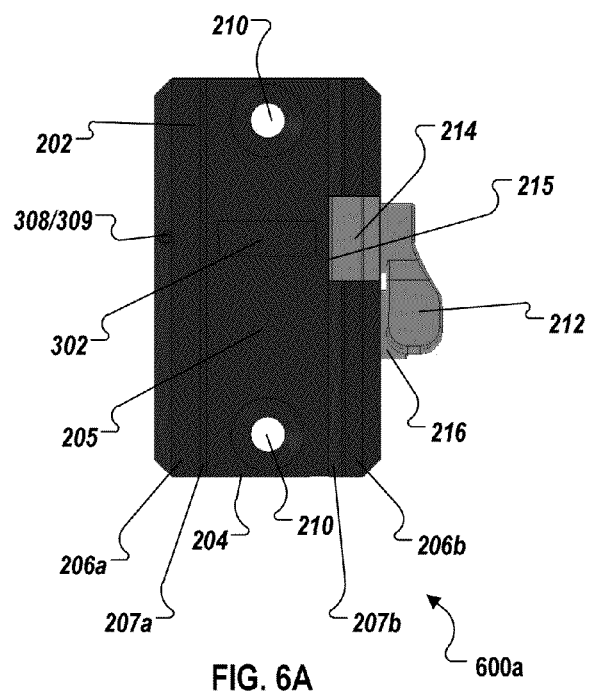
FIG. 6A is a bottom view of the QD mount 200 showing the position of the rail clamp in relation to the mounting arm in the first (gripping) position.

FIG. 6A is a bottom view 600a of the QD mount 200 showing the position of the rail clamp 214 in relation to the mounting arm 212 in the first (gripping) position. Due to the orientation of the illustrated QD mount 200, rail clamp 214 is in a leftward position in relation to the mounting arm due to the cam action of mounting arm 212 and the rail clamp 214. Here, the second engagement surface 215 is in a position to engage a second side of a rail 106 if engaged with the QD mount 200.

Figure 6B:
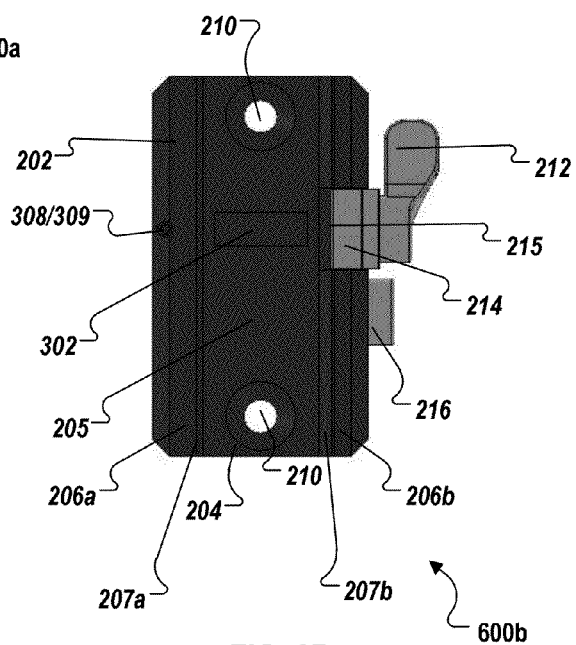
FIG. 6B is a bottom view of the QD mount 200 showing the position of the rail clamp in relation to the mounting arm in the second (released) position.

FIG. 6B is a bottom view 600b of the QD mount 200 showing the position of the rail clamp 214 in relation to the mounting arm 212 in the second (released) position. Due to the orientation of the illustrated QD mount 200, rail clamp 214 is in a rightward position in relation to the mounting arm 212 due to the cam action of mounting arm 212 and the rail clamp 214. Here, the second engagement surface 215 is in a disengaged position from a second side of a rail 106 if engaged with the QD mount 200.

The foregoing description is provided in the context of one or more particular implementations. Various modifications, alterations, and permutations of the disclosed implementations can be made. For example, although the foregoing QD mount has been described in terms of attachment to a rail, as will be appreciated by those skilled in the art, the QD mount can be adapted to clamp to any accessory mounting surface in a manner consistent with this disclosure. In addition, the QD mount can be adapted to provide various accessory engagement interface configurations with which to engage an accessory. Thus, the present disclosure is not intended to be limited only to the described and/or illustrated implementations, but is to be accorded the widest scope consistent with the principles and features disclosed herein.

What is claimed is:

1. A quick-detach accessory base mount, comprising:
a body comprising:
an accessory engagement interface configured to engage an accessory;
a rail engagement interface defining a channel adapted to receive an accessory rail;
a rail clamp carried by the body and moveable to selectively clamp the body to the accessory rail;
a mounting arm coupled with a pivot shaft, the mounting arm extending outwardly from the body and carried to rotate relative to the body between a first position and a second position;
a preload screw threaded onto the pivot shaft at the end of the pivot shaft opposite the mounting arm and the rail clamp;
a cam configured to support the rail clamp to grip the accessory rail and clamp the body to the accessory rail when the mounting arm is in the first position and release the rail clamp from gripping the accessory rail when the mounting arm is in the second position; and
an interlock configured to selectively restrict rotation of the mounting arm between the first position and the second position, the interlock comprising a depressible interlock button depressible to a position allowing rotation of the mounting arm between the first position and the second position and springily biased to extend outward from the body to a position blocking rotation of the mounting arm between the first position and the second position and an interlock set screw coupled to the depressible interlock button, the interlock set screw rotatable to adjust the outward extension of the depressible interlock button from the body.

2. The accessory base mount of claim 1, where the cam comprises a first portion defined by the mounting arm and a second portion defined by the rail clamp.

3. The accessory base mount of claim 2, where the second portion of the cam comprises a surface configured to prohibit rotation of the mounting arm beyond at least one rotational endpoint defined by the first position and the second position.

4. The accessory base mount of claim 1, where the channel is defined by the body as a first wall and a second wall, the first wall comprising a first engagement surface adapted to grip a first side of the accessory rail and the second wall comprising a resting surface adapted to support a portion of a second side of the accessory rail.

5. The accessory base mount of claim 4, where the rail clamp comprises a second engagement surface adapted to grip the second side of the accessory rail.

6. The accessory base mount of claim 1, wherein the channel is narrower at an end.

7. The accessory base mount of claim 1, where the rail clamp is springily biased in an ungripped position.

8. The accessory base mount of claim 1, wherein the preload screw is rotatable to adjust the outward extension of the mounting arm from the body and a springily-biased position of the rail clamp.

9. The accessory base mount of claim 8, comprising a preload grub screw, the preload grub screw rotatable between an engaged position to prevent rotation of the preload screw around the pivot shaft and an unengaged position allowing rotation of the preload screw around the pivot shaft.

10. The accessory base mount of claim 1, comprising a slot engagement bar for engaging with a slot configured into the accessory rail to prevent lateral movement of the body along an axis transverse to the slot.

11. A quick-detach accessory base mount having:
a cam that supports a rail clamp to grip an accessory rail when a mounting arm coupled with a pivot shaft is in a first position and to release the rail clamp when the mounting arm is in a second position;

a preload screw threaded onto the pivot shaft at the end of the pivot shaft opposite the mounting arm and the rail clamp; and an interlock configured to selectively restrict rotation of the mounting arm between the first position and the second position, the interlock comprising a depressible interlock button depressible to a position allowing rotation of the mounting arm between the first position and the second position and springily biased to extend outward from a body carrying the interlock to a position blocking rotation of the mounting arm between the first position and the second position and an interlock set screw coupled to the depressible interlock button, the interlock set screw rotatable to adjust the outward extension of the depressible interlock button from the body.

12. The accessory base mount of claim 11, having a rail engagement interface that receives the accessory rail into a channel narrower at one end.

13. The accessory base mount of claim 11, wherein a cam configuration prohibits rotation of the mounting arm beyond rotational endpoints defined by the first position and the second position.

14. A method for attaching an accessory to an accessory rail, comprising:

generating a clamping preload with respect to the accessory rail using a preload screw threaded onto a pivot shaft coupled to a mounting arm, the preload screw at the end of the pivot shaft opposite the mounting arm and a rail clamp;

gripping the accessory rail with the rail clamp supported by a cam in response to rotation of the mounting arm to a first position;

selectively restricting rotation of the mounting arm between the first position and a second position with an interlock, the interlock comprising a depressible interlock button depressible to a position allowing rotation of the mounting arm between the first position and the second position and springily biased to extend outward from a body carrying the interlock to a position blocking rotation of the mounting arm between the first position and the second position and an interlock set screw coupled to the depressible interlock button, the interlock set screw rotatable to adjust the outward extension of the depressible interlock button from the body; and releasing the rail clamp in response to rotation of the mounting arm to the second position.

15. The method of claim 14, comprising depressing the interlock button to permit rotation of the mounting arm between the first and the second position.

16. The method of claim 14, comprising receiving the accessory rail into a rail engagement interface channel narrower at one end.

17. The method of claim 14, comprising configuring the cam to prohibit rotation of the mounting arm beyond rotational endpoints defined by the first position and the second position.

* * * * *